(12) United States Patent
Snodgrass, Jr.

(10) Patent No.: US 6,739,231 B2
(45) Date of Patent: May 25, 2004

(54) QUICK RELEASE DEVICE FOR BAND SAWS OR THE LIKE

(76) Inventor: Howard L. Snodgrass, Jr., 1160 Fieldstone Rd., Watkinsville, GA (US) 30677

( * ) Notice: Subject to any disclaimer, the term of this patent is extended or adjusted under 35 U.S.C. 154(b) by 0 days.

(21) Appl. No.: 09/887,286

(22) Filed: Jun. 22, 2001

(65) Prior Publication Data

US 2001/0054337 A1 Dec. 27, 2001

Related U.S. Application Data

(60) Provisional application No. 60/213,821, filed on Jun. 23, 2000.

(51) Int. Cl.[7] .............................. B26D 1/48; B27B 13/08
(52) U.S. Cl. ........................................................ 83/816
(58) Field of Search .......................... 83/816, 662, 169, 83/802, 795, 797, 697, 698.71; 143/21, 17; 403/330, 321

(56) References Cited

U.S. PATENT DOCUMENTS

| | | | |
|---|---|---|---|
| 769,497 A | 9/1904 | Seymour | |
| 1,571,972 A | 2/1926 | Schettler | |
| 2,525,557 A | 10/1950 | Martignone | |
| 2,627,881 A | 2/1953 | Houtte et al. | 143/17 |
| 3,465,794 A | 9/1969 | McLauchlan et al. | 143/17 |
| 3,521,682 A | 7/1970 | Schnizler, Jr. | 143/21 |
| 4,311,074 A | 1/1982 | Titus | 83/816 |
| 4,535,666 A | 8/1985 | Fiori et al. | 83/795 |
| 4,640,171 A | 2/1987 | Jansson | 83/797 |
| 5,305,673 A | 4/1994 | Costley | 83/802 |
| 5,662,017 A | 9/1997 | Mellon | 83/169 |
| 5,941,153 A | 8/1999 | Chang | 83/662 |

*Primary Examiner*—Glenn Caldarola
*Assistant Examiner*—Thanh P. Duong
(74) *Attorney, Agent, or Firm*—Webb Ziesenheim Logsdon Orkin & Hanson, P.C.

(57) ABSTRACT

A method and apparatus for tensioning a continuous loop, such as a cutting blade installed on a band saw having a frame, a manually rotatable tensioner, a first pulley rotatably connected to the manually rotatable tensioner, a second pulley spaced away from the first pulley, and a cutting blade strung between the first pulley and the second pulley, generally including the steps of positioning an adjustable body, such as a reciprocally actuated rod, between the manually rotatable tensioner and the second pulley, extending the adjustable body in a direction away from the second pulley and toward the manually rotatable tensioner so that the manually rotatable tensioner and the first pulley move in direction away from the second pulley, withdrawing the adjustable body in a direction toward the second pulley so that the manually rotatable tensioner and the first pulley move in a direction toward the second pulley.

21 Claims, 10 Drawing Sheets

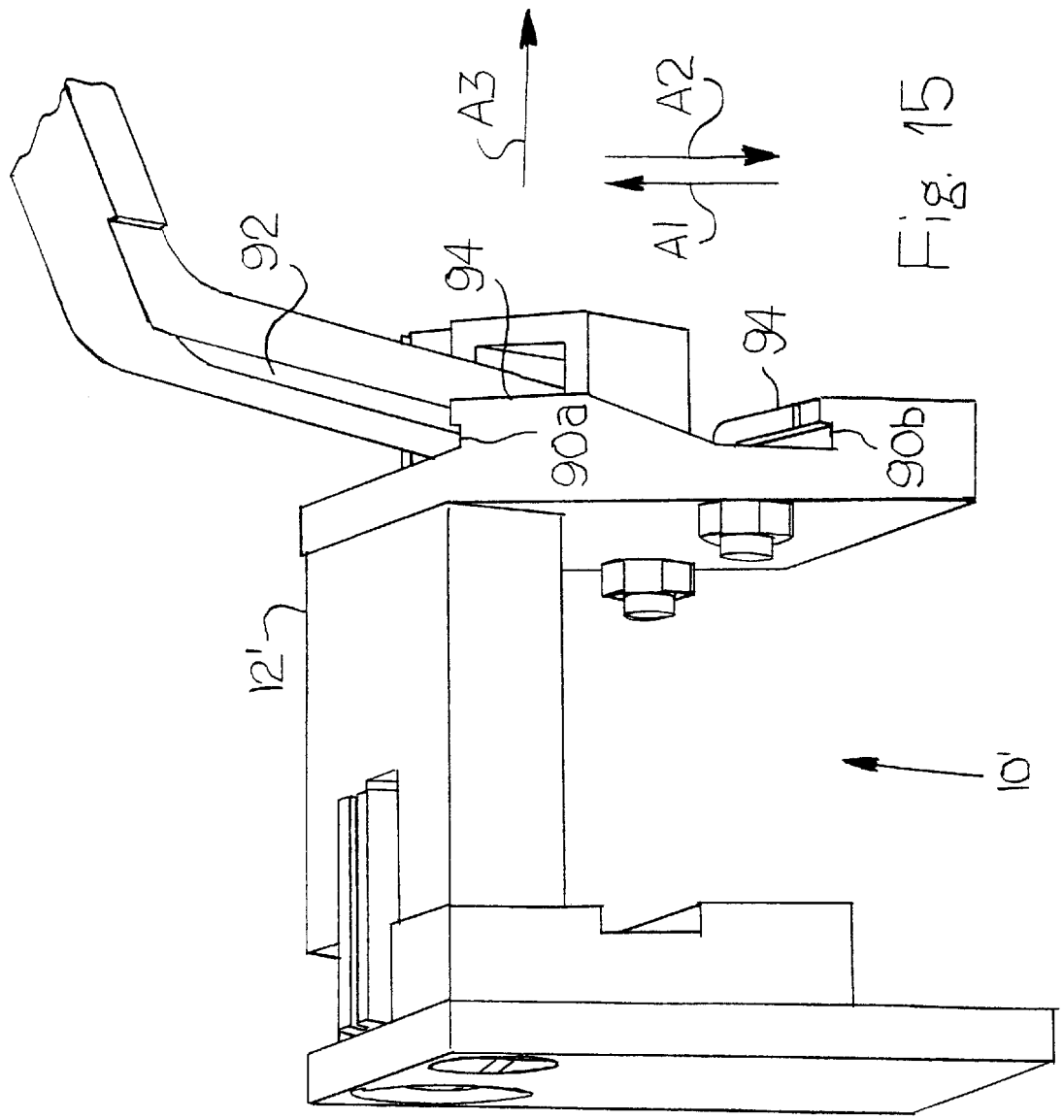

QUICK RELEASE DEVICE FOR BAND SAWS OR THE LIKE

CROSS-REFERENCE TO RELATED APPLICATION

This application claims the benefit of earlier filed U.S. Provisional Patent Application Ser. No. 60/213,821, filed Jun. 23, 2000, entitled "Quick Release Device."

BACKGROUND OF THE INVENTION

1. Field of the Invention

The present invention generally relates to tensioners and, more particularly, to tensioners for band saw cutting blades and the like.

2. Brief Description of the Prior Art

As shown in FIG. 1, band saws A generally include a frame B, a first pulley shroud C connected to the frame B, a manually rotatable tensioner, such as a screw-type tensioner D, removably and slideably attached to the frame B by slots E, a first pulley F (shown in phantom) rotatably attached to the screw-type tensioner D, a second pulley G (shown in phantom) lying in the same plane as the first pulley F and rotatably attached to the frame B, a second pulley shroud H connected to the frame B, a continuous cutting blade I attached to the first pulley F and the second pulley G, a blade guide attachment bar J, and a motor O connected to the second pulley G.

In normal operation, the cutting blade I must be tensioned to make the cutting blade I taut. Conversely, when the cutting blade I is worn or replacement is desired, the cutting blade I must be detensioned so that the cutting blade I can be removed from the first and second pulleys F,G.

Tensioning the cutting blade I is normally accomplished by positioning the cutting blade I on the first and second pulleys F,G and then moving the first pulley F, which lies in substantially the same plane as the second pulley G, directly away from the second pulley G. Detensioning is accomplished by moving the first pulley F toward the second pulley G. Movement of the first pulley F is facilitated by the screw-type tensioner D shown in FIG. 1. As shown in FIG. 2, the screw-type tensioner D includes a tension body K that receives, usually in a common thread arrangement, a rotatable shaft L. The tension body K is fitted into the slots E formed by the frame B so that the tension body K is moveable with respect to the frame B, as illustrated by the arrows Y1 and Y2. The tension body K further includes a shaft N that receives the first pulley F shown in FIG. 1.

With continuing reference to FIG. 2, a first end M of the rotatable shaft L contacts the frame B, so that when the rotatable shaft L is rotated in a tightening direction, shown by arrow Z1, the tension body K and the first pulley F move in the Y1 direction. This tightens the cutting blade I. When the rotatable shaft L is rotated in a loosening direction, shown by arrow Z2, the tension body K and the first pulley F move in the Y2 direction. This creates slack in the cutting blade I.

Another type of manually rotatable tensioner is disclosed in U.S. Pat. No. 769,497 to Seymour (hereinafter "the Seymour patent"). The Seymour patent discloses a tensioner having a rack and pinion arrangement actuated by a rotatable handwheel.

One drawback of the prior art manually rotatable tensioners, such as the screw-type and the handwheel-type discussed above, is that they are rotated incrementally by hand. Therefore, each time the cutting blade is retensioned, the correct number of turns of the rotatable shaft L or the handwheel must be approximated. This involves a process of trial and error, which is inaccurate and time consuming.

SUMMARY OF THE INVENTION

To help eliminate some of the drawbacks of the prior art rotatable tensioners, it is an object of the present invention to provide a tensioner which is easily operated and does not require significant amounts of trial and error manipulation during retensioning of the cutting blade.

The present invention generally includes a method and apparatus for tensioning a belt, saw blade, or other continuous loop. One method to adjust the tension of a cutting blade installed on a band saw having a frame, a manually rotatable tensioner positioned adjacent to the frame, a first pulley rotatably connected to the manually rotatable tensioner, a second pulley spaced away from the first pulley, and a cutting blade strung between the first pulley and the second pulley includes the step of positioning an adjustable body between the manually rotatable tensioner and the second pulley. This step is followed by one or more of the following steps, including extending the adjustable body in a direction away from the second pulley and toward the manually rotatable tensioner so that the manually rotatable tensioner and the first pulley move in direction away from the second pulley or withdrawing the adjustable body in a direction toward the second pulley so that the manually rotatable tensioner and the first pulley move in a direction toward the second pulley. The adjustable body is preferably a rack, and the manually rotatable tensioner is preferably a screw-type tensioner having a manually rotatable shaft with opposing ends. Additional steps may include positioning the rack adjacent to an opposing end of the manually rotatable shaft, extending the rack in a direction away from the second pulley to tension the cutting blade, and withdrawing the rack in a direction toward the second pulley to detension the cutting blade.

Another method to adjust the tension of a cutting blade installed on a band saw having a frame, a screw-type tensioner positioned adjacent to the frame, the screw-type tensioner having a rotatable shaft with opposing ends, a first pulley rotatably connected to the screw-type tensioner, and a second pulley spaced away from the first pulley generally includes the steps of positioning a rack and a rotatable pinion gear between the screw-type tensioner and the second pulley, wherein the rack and pinion gear are connected by an intermeshed relationship, and the rack is movable by the pinion gear, extending the rack in a direction away from the second pulley to tension the cutting blade, and withdrawing the rack in a direction toward the second pulley to detension the cutting blade.

A band saw according to the present invention generally includes a frame having a motor connected to the frame, a first pulley and a second pulley, with the first pulley rotatably connected to the manually rotatable tensioner and the second pulley rotatably connected to the motor, a pull-type tensioner positioned between the manually rotatable tensioner and the second pulley, and a cutting blade strung between the first pulley and the second pulley. The manually rotatable tensioner is preferably a screw-type tensioner. The pull-type tensioner may include a mount defining a pivot shaft receiving orifice, a pivot shaft received in the pivot shaft receiving orifice, the pivot shaft having a first end and a second opposite end, a pinion gear positioned adjacent to the first end of the shaft, a handle positioned adjacent to the second opposite end of the shaft, and a rack connected by an intermeshed tooth relationship with the pinion gear. In operation, the handle is rotated in a first direction with respect to the mount, and the pinion gear acts to extend the rack in a direction away from the mount. When the handle is rotated in a second direction, opposite to the first direction, the pinion gear acts to withdraw the rack in a direction toward the mount.

These and other features of the present invention will be clarified in the Detailed Description of the Preferred Embodiments taken together with the attached drawings in which like reference numerals represent like elements throughout.

BRIEF DESCRIPTION OF THE DRAWINGS

FIG. 15 is a perspective view of the pull-type tensioner shown in FIG. 14.

DETAILED DESCRIPTION OF THE PREFERRED EMBODIMENT

A first embodiment pull-type tensioner 10 according to the present invention is shown in FIGS. 3–13, and is also described in U.S. Provisional Patent Application No. 60/213,821, herein incorporated by reference in its entirety.

Figure 1:
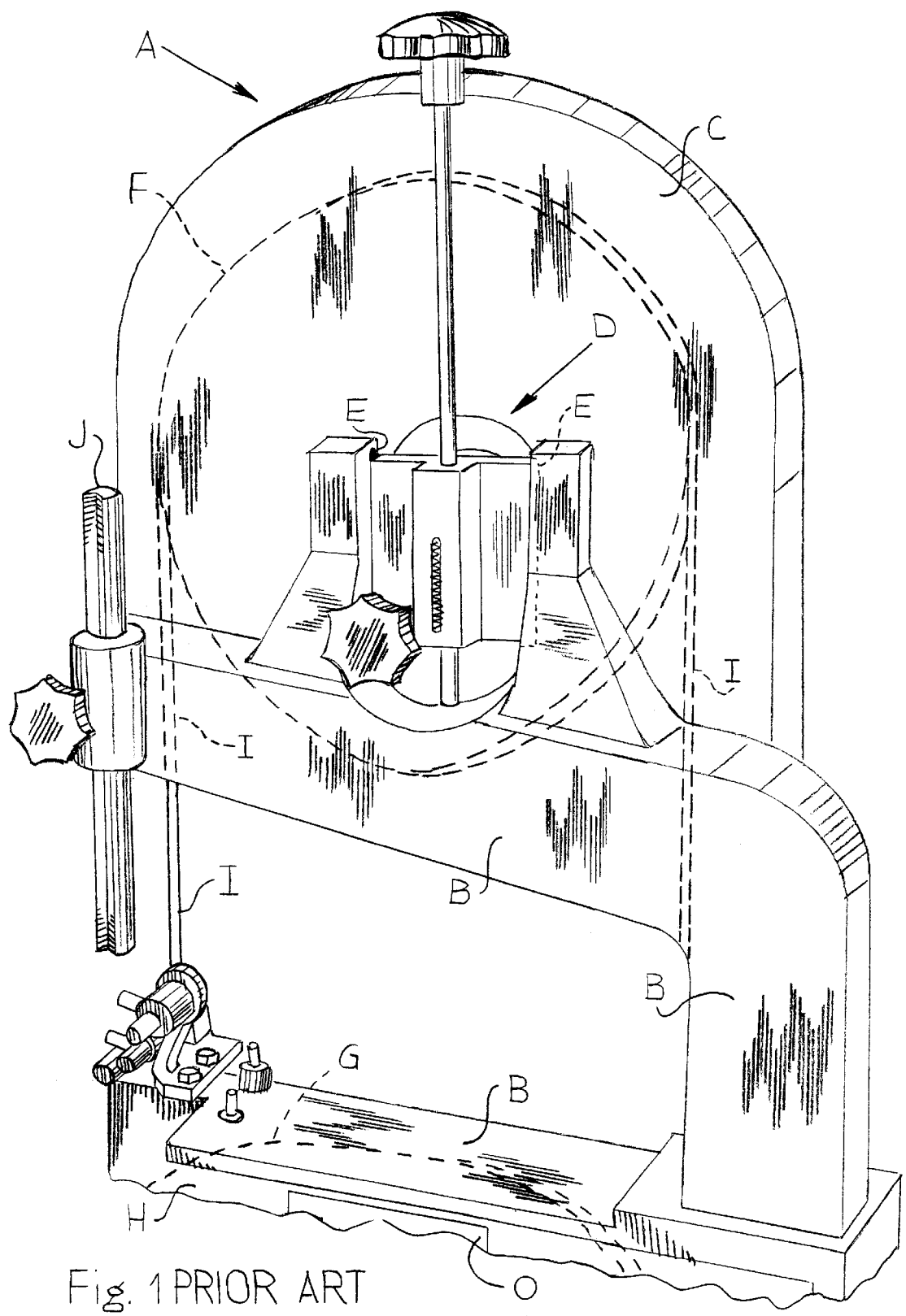
FIG. 1 is a perspective side view of a band saw according to the prior art with a screw-type tensioner installed, the screw-type tensioner having a tension body and a manually rotatable shaft, wherein a second end of the manually rotatable shaft engages a frame of the band saw.
Figure 2:
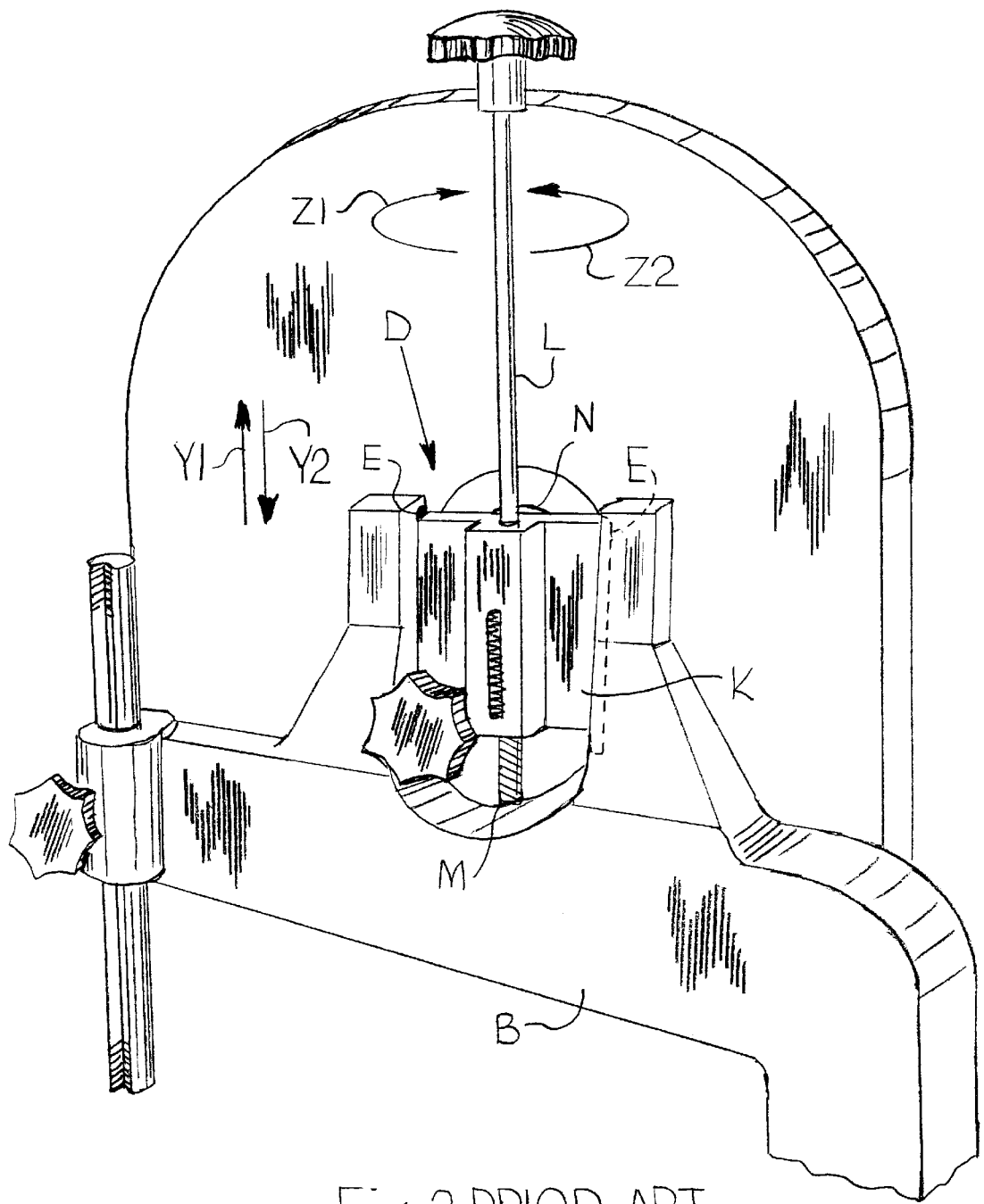
FIG. 2 is a perspective side view showing engagement of the manually rotatable shaft of the screw-type tensioner on the band saw frame of FIG. 1.
Figure 3:
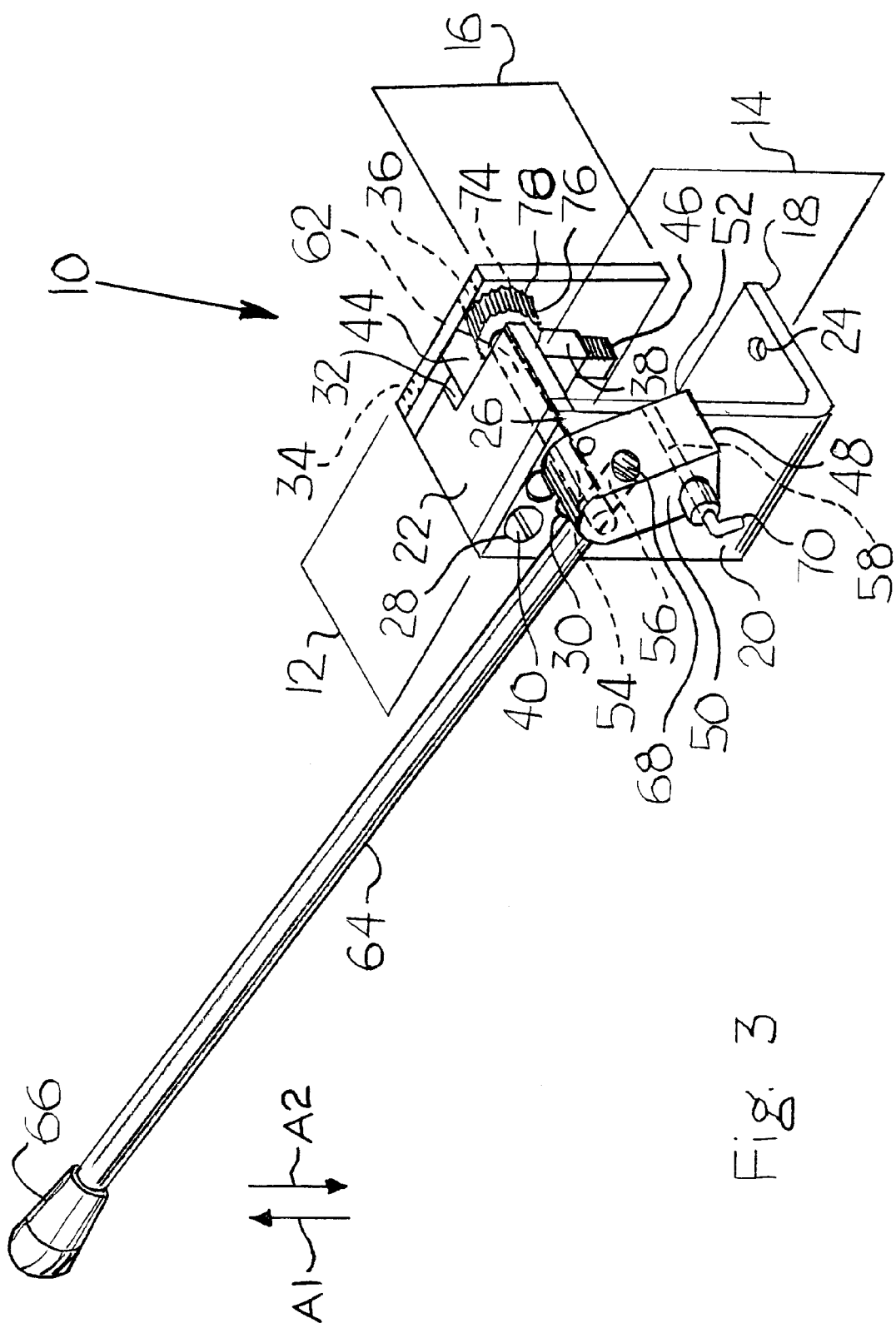
FIG. 3 is a top perspective view of a pull-type tensioner according to a first embodiment of the present invention.
Figure 4:
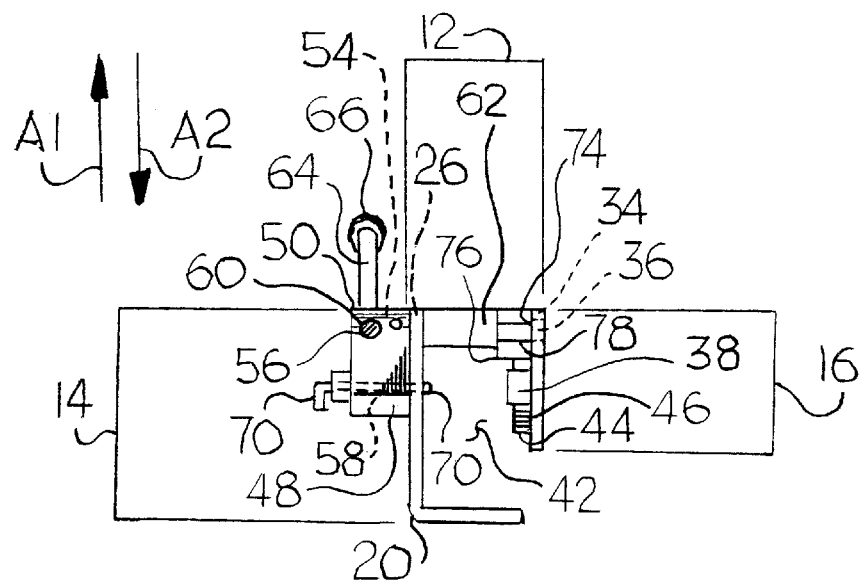
FIG. 4 is a front view of the pull-type tensioner shown in FIG. 3.
Figure 5:
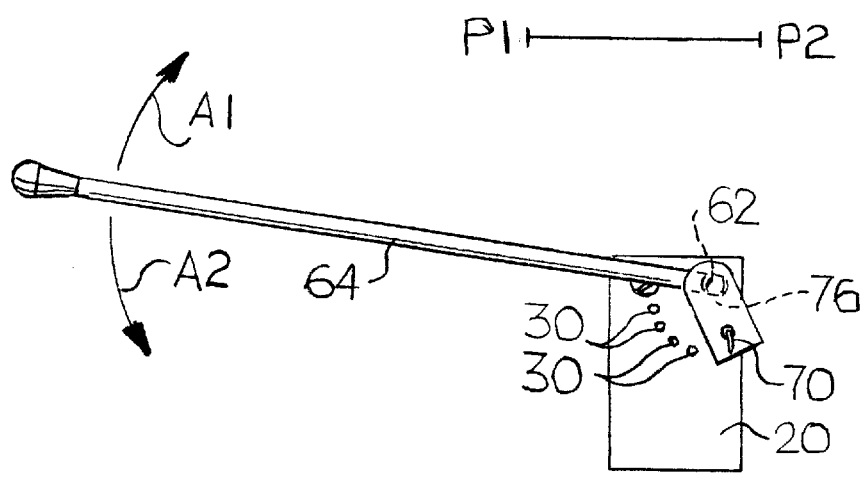
FIG. 5 is a side view of the pull-type tensioner shown in FIG. 3.

Referring to FIGS. 3–5, and particularly FIG. 3, a pull-type tensioner 10 according to a first embodiment of the present invention preferably includes a mount 12 having a first section 14 and a second section 16. The first section 14 is generally C-shaped and includes a first bracket portion 18, a second bracket portion 20, and a third bracket portion 22. The first bracket portion 18 forms a first fastener-receiving orifice 24. The second bracket portion 20 is positioned perpendicularly adjacent to the first bracket portion 18, with the second bracket portion 20 forming a first shaft-receiving orifice 26, a second fastener-receiving orifice 28, and a plurality of adjustment orifices 30. The third bracket portion 22 is positioned perpendicularly adjacent to the second bracket portion 20 and opposite and parallel to the first bracket portion 18. The third bracket portion 22 forms a rack orifice 32.

As shown in FIGS. 3 and 4, the second section 16 of the mount 12 forms a third fastener-receiving orifice 34, a second shaft-receiving orifice 36, and a rack guide 38. The first section 14 of the mount 12 and the second section 16 of the mount 12 are formed from metal or other suitable material and are connected to one another by a fastener 40 (FIG. 3 only), such as a threaded screw, which is received by the second fastener-receiving orifice 28 formed by the second bracket portion 20 and the third fastener-receiving orifice 34 formed by the second section 16.

As shown in detail in FIG. 4, when assembled, the first section 14 and the second section 16 of the mount 12 form a mount cavity 42. As shown in FIGS. 3 and 4, a rack 44, forming rack grooves 46, is movably housed in the rack guide 38 formed by the second section 16 of the mount 12.

With continuing reference to FIGS. 3 and 4, a handle attachment member 48 has a first side 50 and a second side 52, with the second side 52 forming a pivot shaft orifice 54, a handle orifice 56, and a pin orifice 58. The handle attachment member 48 is positioned adjacent to a first end 60 of a pivot shaft 62, with the pivot shaft orifice 54 receiving the first end 60 of the pivot shaft 62. A handle 64, having a knob end 66 and a second handle end 68, is received in the handle orifice 56 of the handle attachment member 48. A pin 70, biased by a spring (not shown), is received in the pin orifice 58.

With continuing reference to FIGS. 3 and 4, the pivot shaft 62 extends from the second bracket portion 20 of the first section 14 of the mount 12 to the second section 16 of the mount 12, with the first end 60 of the pivot shaft 62 received in the first shaft-receiving orifice 26 and a second end 74 of the pivot shaft 62 received in the second shaft-receiving orifice 36. A pinion gear 76 is attached to the second end 74 of the pivot shaft 62 and is preferably positioned inside the mount cavity 42. The pinion gear 76 forms pinion teeth 78 which intermesh with the rack grooves 46 of the rack 44.

As shown in FIG. 4, when the pin 70 is inserted in a pin orifice 58, the pin 70 protrudes beyond the second side 52 of the handle attachment member 48 and engages one of the plurality of adjustment orifices 30 (see FIG. 3 or 5) formed by the second bracket portion 20 of the mount 12. With particular reference to FIGS. 4 and 5, when the pin 70 is pulled directly away from the first side 50 of the handle attachment member 48, the handle 64 can be rotated in a first direction A1 or a second direction A2 (clockwise or counterclockwise).

The following few paragraphs describe the movement of various parts of the first embodiment of the present invention. For reference, it should be assumed that the rack 44 is initially positioned so that the rack 44 is withdrawn or housed in the rack guide 38, and is not protruding through the rack orifice 32 formed by the third bracket portion 22. Moreover, the handle 64 should initially be assumed to be approximately aligned at position P1, as viewed in FIG. 5. The initial alignment of the rack 44 and the handle 64 is not critical to the overall operation of the present invention, but this alignment will provide the reader with a clear frame of reference. The frame of reference is important because if the handle 64 is positioned at position P2 (opposite to position P1 in FIG. 5) and the rack 44 is positioned so that it does not protrude through the rack orifice 32, rotation of the handle 64 clockwise from position P2 to position P1 would extend the rack 44 away from the mount 12, through the rack orifice 32. The movement of the handle 64 would then initially be in a direction opposite to the movement direction of the rack 44. Because the following describes coordinated movement between the handle 64 and the rack 44, the initial starting orientations discussed above should be presumed.

With continuing reference to FIGS. 4 and 5, when the handle 64 is rotated in the first direction A1, the pivot shaft 62 and the attached pinion gear 76 rotate. Because the pinion gear 76 and the rack 44 (shown in FIG. 4) are engaged in a tooth and groove arrangement, the rotation of the pinion gear 76 causes the rack 44 (FIG. 4) to extend in a direction away from the mount 12. When the handle 64 is moved in a second direction A2, opposite to the first direction A1, the rack 44 (FIG. 4) withdraws in a direction toward the mount 12.

The first embodiment pull-type tensioner according to the present invention is preferably used in conjunction with a screw-type tensioner and can be installed on band saws in the following manner. The following steps and illustrations highlight a 14" JET brand of bandsaw. However, the steps are also applicable to other popular brands of bandsaws.

Figure 6:
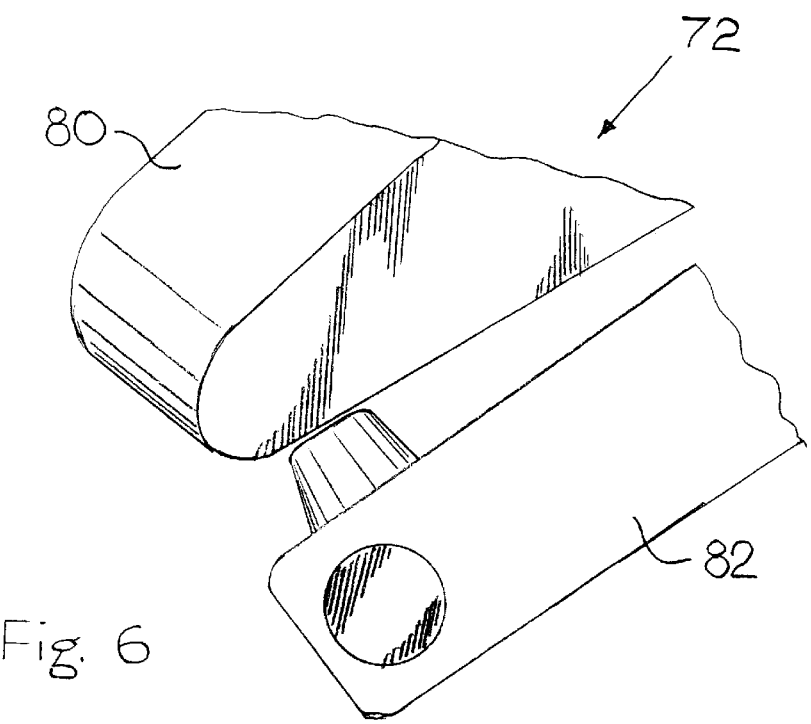
FIG. 6 is a top perspective view of a first pulley shroud being separated from a frame in preparation for installing the pull-type tensioner shown in FIGS. 3–5.
Figure 7:
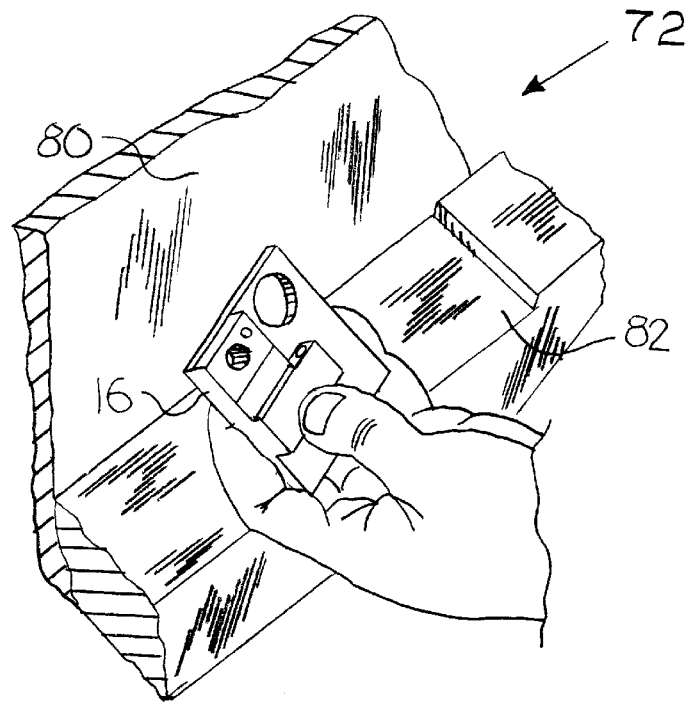
FIG. 7 is a top perspective view of a second section of a mount according to the first embodiment of the present invention.
Figure 8:
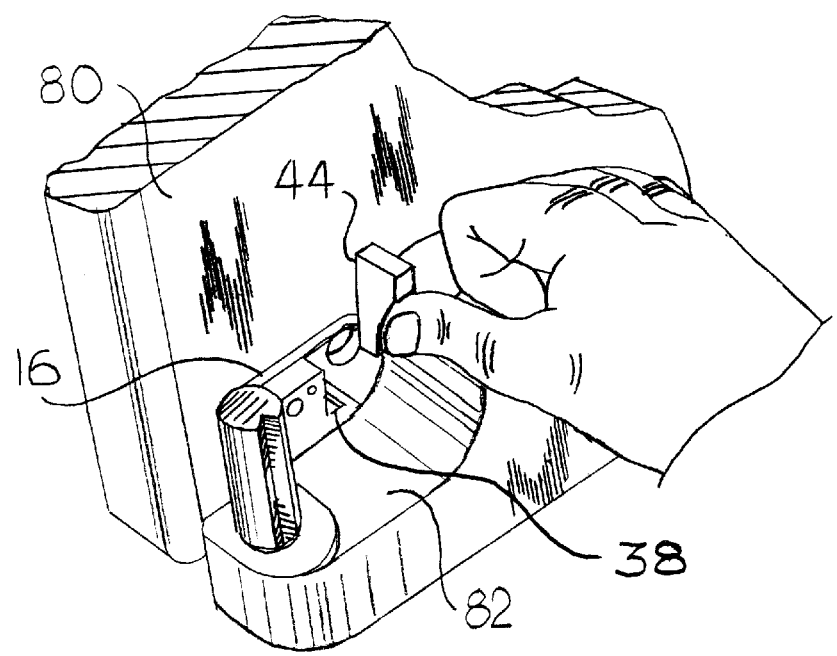
FIG. 8 is a top perspective view of the second section of the mount shown in FIG. 7 being positioned between the first pulley shroud and a frame.
Figure 9:
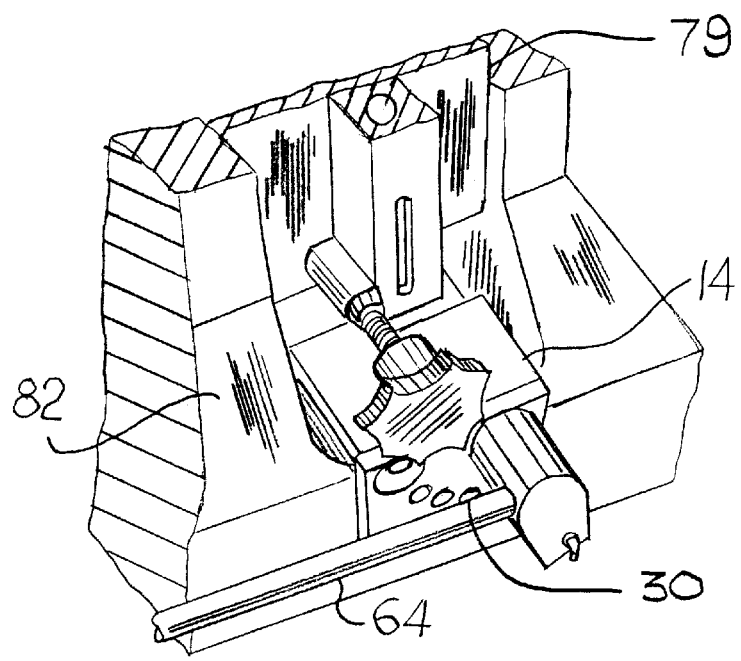
FIG. 9 is a top perspective view of the second section of the mount shown in FIGS. 7–8 positioned adjacent to a screw-type tensioner.
Figure 10:
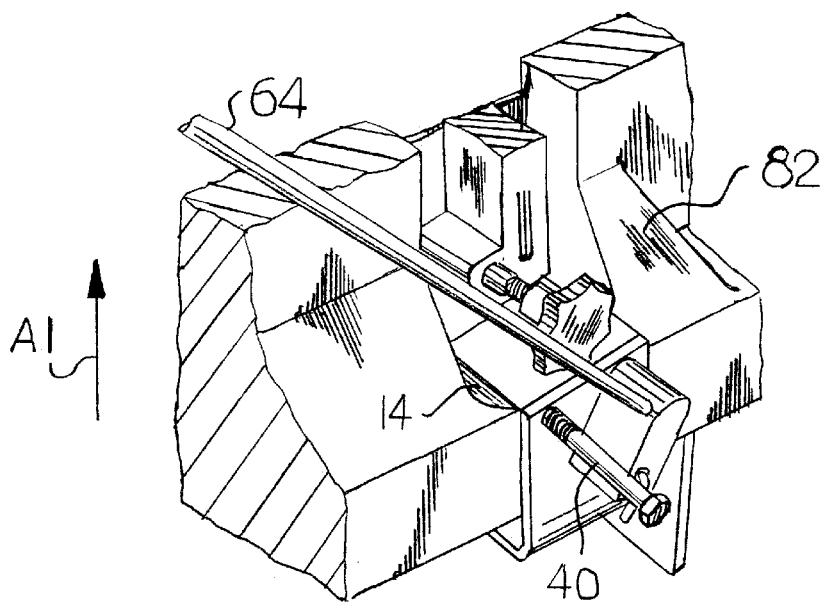
FIG. 10 is a top perspective view of a first section of the mount being attached to the second section of the mount, shown in FIGS. 7–9, by a fastener.
Figure 11:
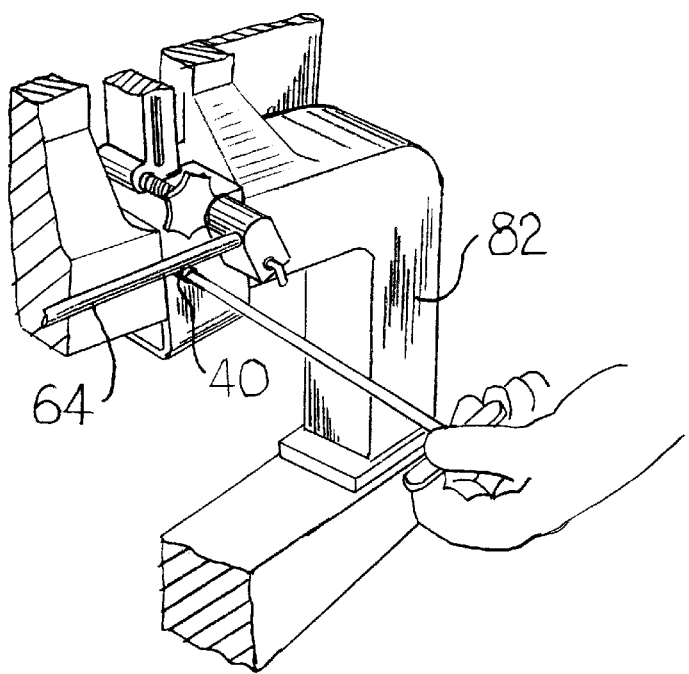
FIG. 11 is a top perspective view of the fastener shown in FIG. 10 being installed.
Figure 12:
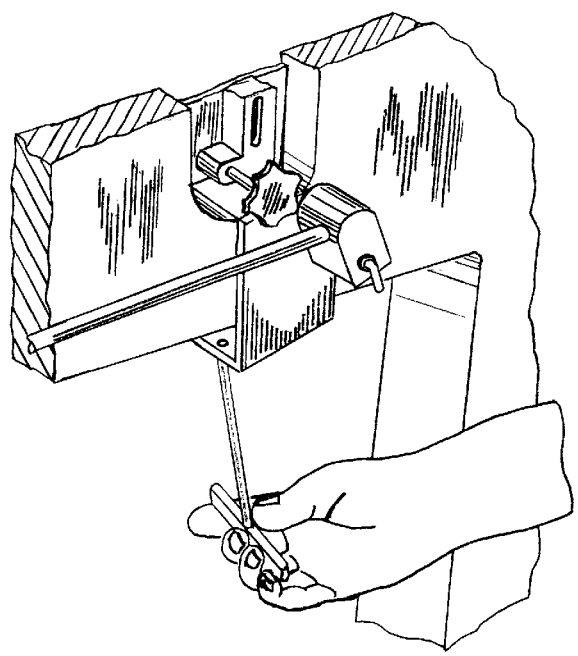
FIG. 12 is a top perspective view of the pull-type tensioner shown in FIGS. 3–5 and 9–11 being clamped to the frame with fasteners.

Retrofitting a band saw 72 with a pull-type tensioner 10 according to a first embodiment of the present invention includes the steps of disconnecting power to the band saw 72 for safety and loosening the screw-type tensioner 79, if installed, by rotating the manually rotatable shaft 81 in a counterclockwise or loosening direction. As shown in FIG. 6, the next step is loosening the first pulley shroud 80 so that the first pulley shroud 80 can be pulled away from the frame 82 of the band saw 72. The first pulley shroud 80 does not have to be completely removed, but only pulled slightly away from the frame 82. As shown in FIG. 7, the next step is sliding the second section 16 of the mount 12, with the rack 44 removed, between the frame 82 and the first pulley shroud 80. As shown in FIG. 8, the next step is installing the rack 44 in the rack guide 38 formed by the second section 16 of the mount 12. As shown in FIG. 9, the next step is sliding the first section 14 of the mount 12 over the frame 82, with the rack 44 fully seated in the rack guide 38 and the handle 64 rotated and locked in the last available adjustment orifice 30. This ensures that the pinion gear 76 engages the rack 44 in the proper position. As shown in FIG. 10, the next step is rotating the handle 64 in the first direction A1 and attaching the first section 14 of the mount 12 to the second section 16 of the mount 12 using a fastener 40. As shown in FIGS. 11 and 12, the next step is clamping the mount 12 to the frame 82 by fasteners 40 received by the first bracket portion 18 of the mount 12 and by fasteners 40 received by the second bracket portion 20 of the mount 12. The first pulley shroud 80 is then retighted and the manually rotatable shaft 81 of the screw-type tensioner 79 is adjusted so that a rack-receiving surface 45 of the rack 44 engages the rotatable shaft 81. Finally, power is restored to the band saw.

Figure 13:
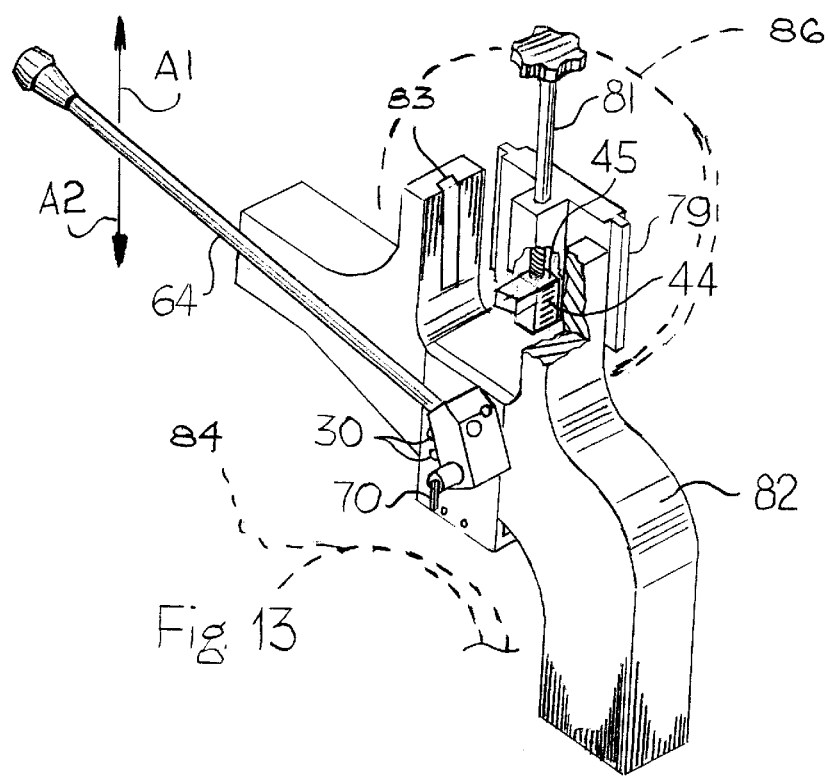
FIG. 13 is a top perspective view of the pull-type tensioner shown in FIGS. 3–5 installed on a band saw between the frame and a screw-type tensioner.

FIG. 13 shows the pull-type tensioner 10 according to the present invention positioned beside the frame 82 for clarity. However, in actual operation, the screw-type tensioner 79 fits in slots 83. When the pull-type tensioner 10 according to the first embodiment of the present invention is installed on the frame 82 of a band saw 72, the rotatable shaft 81 of the screw-type tensioner 79 should not have to be readjusted during subsequent tensioning or detensioning of a continuous cutting blade. Subsequent tensioning of the cutting blade is accomplished completely by the first embodiment pull-type tensioner by moving the pin 70 so that it no longer engages a corresponding adjustment orifice 30. The handle 64 is then moved in the first direction A1, causing rotation of the pinion gear 76. The rotating pinion gear 76 causes the rack 44 to extend away from the mount 12 and a second pulley 84, which is spaced away from a first pulley 86, until the rack-receiving surface 45 of rack 44 begins to exert a force on the rotatable shaft 81 of the screw-type tensioner 79. The screw-type tensioner 79 and the first pulley 86, rotatably attached thereto, thus also move in a direction away from the mount 12 and the second pulley 84. This extension of the rack 44 and movement of the first pulley 86 away from the second pulley 84 tensions a cutting blade strung between the first pulley 86 and the second pulley 84. The pin 70 is then moved into another adjustment orifice 30 to fix the handle 64, rack 44, and pinion gear 76 in place.

Detensioning a cutting blade is accomplished by moving the pin 70 so that the pin 70 no longer engages a corresponding adjustment orifice 30. The handle 64 is then moved in a second direction A2. Rotation of the pinion gear 76 causes the rack 44 to withdraw in a direction toward the mount 12 and the second pulley 84. This withdrawal of the rack 44 causes the screw-type tensioner 79 and the first pulley 86, which is rotatably attached thereto, to move in a direction toward the mount 12 and the second pulley 84. The movement of the first pulley 86 in a direction toward the second pulley 84 detensions the cutting blade strung between the first and second pulleys 86, 84.

Figure 14:
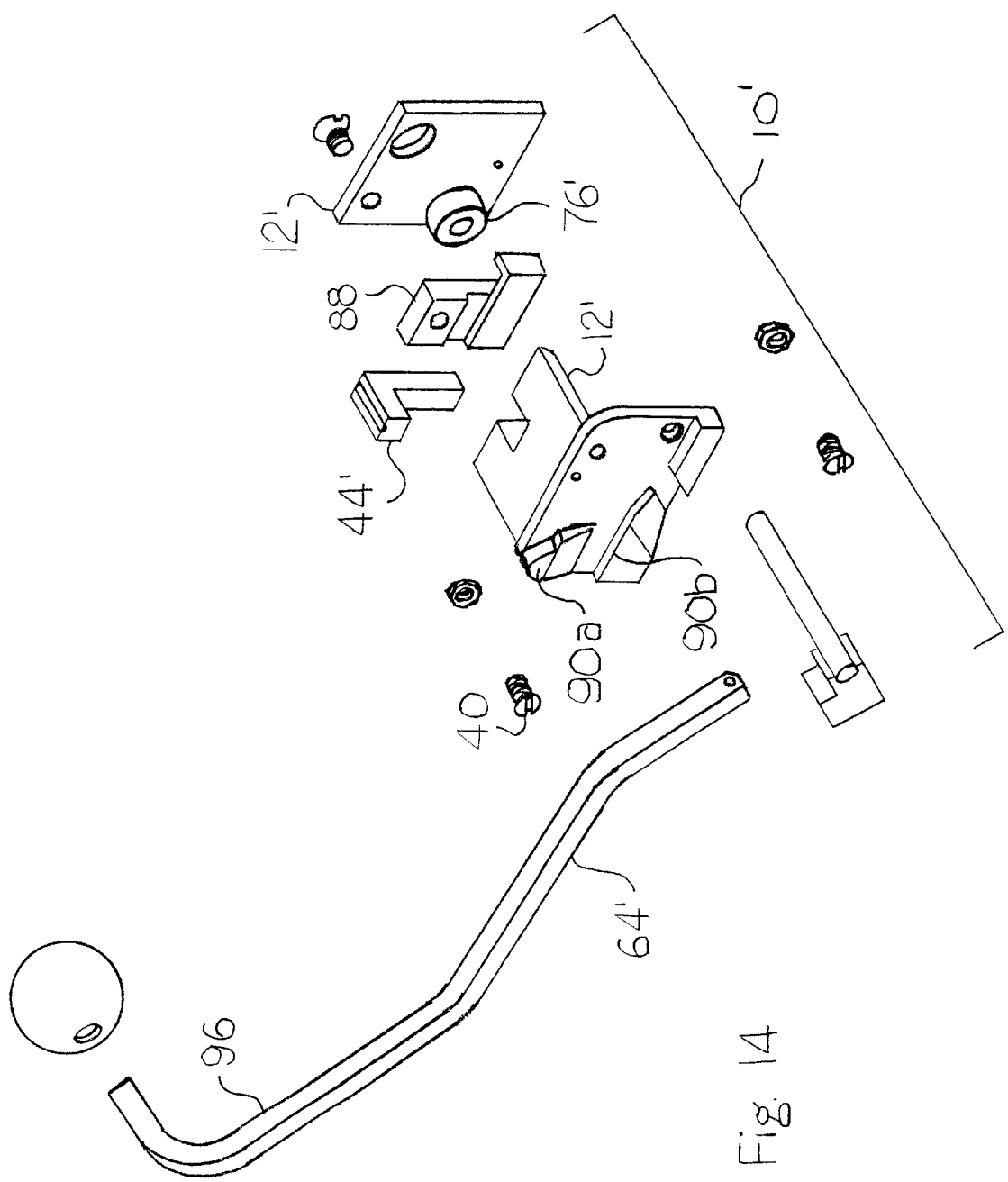
FIG. 14 is an exploded view of a pull-type tensioner according to a second embodiment of the present invention.

A second embodiment pull-type tensioner 10' according to the present invention is shown in FIGS. 14 and 15. The second embodiment pull-type tensioner 10' is similar to the first embodiment pull-type tensioner 10, with like reference numerals indicating like parts. However, while there are similarities between the embodiments 10, 10', such as the rack and pinion operation and the coordinated handle and rack movement discussed in detail above, there are some differences between the first and second embodiments.

For example, in the second embodiment pull-type tensioner 10' shown in FIGS. 14 and 15, the first bracket portion 18 of the first section 14 of the mount 12 described in connection with the first embodiment pull-type tensioner 10 is not required because the second embodiment pull-type tensioner 10' is bolted, welded, or otherwise connected to the frame, such as by the fasteners 40 shown in FIG. 14. By comparison, the first embodiment pull-type tensioner 10 is clamped to the frame 82. Second, as shown in FIG. 14, the mount 12' of the second embodiment pull-type tensioner 10' does not form a rack guide 38 which envelops the rack 44. Instead, the second embodiment pull-type tensioner 10' preferably includes a rack holder 88 which only supports the rack 44. Finally, as shown in FIG. 14, the mount 12' of the second embodiment pull-type tensioner 10' preferably defines one or more dovetail-shaped slots 90A, 90B which, as shown in FIG. 15, receive a tongue 92 defined by the handle 64'. As shown in FIG. 15, when the handle 64' is moved in the first direction A1, the tongue 92 defined by the handle 64' can be seated in the first dovetail-shaped slot 90A.

When the handle 64' is moved in a second direction A2, the tongue 92 can be seated in the second dovetail slot 90B.

The second embodiment pull-type tensioner 10' is installed in generally the same way as the first embodiment pull-type tensioner 10, except that the first pulley 86 and the first pulley shroud 80 are preferably completely removed from the frame 82 of the band saw during installation of the second embodiment pull-type tensioner 10' and then reinstalled. The added installation time of the second embodiment pull-type tensioner 10' is offset by two safety features. First, as shown generally in FIG. 15, to disengage the tongue 92 from any of the dovetail-shaped slots 90A, 90B, the handle 64' is first moved in the first direction A1 until the tongue 92 clears a corresponding slot stop 94, and then the handle 64' is moved in a third direction A3 until the tongue 92 clears the slot stop 94. These movements, designed with safety in mind, help reduce the risk of accidental dislodgment of the handle 64' during operation of the band saw 72. Second, as shown in FIG. 14, the L-shape of the handle 64' provides a visual indicator that the cutting blade is either tensioned or not tensioned. When the cutting blade is tensioned, the handle 64' does not obscure a work platform of the band saw 72. However, when the cutting blade is detensioned, a curved end 96 of the handle 64' lays on the work platform, in front of the operational cutting surface of the cutting blade.

In sum, the present invention seeks to provide a quick, efficient method and apparatus for tensioning a continuous loop, such as a cutting blade. In operation, the present invention is preferably used in conjunction with existing screw-type tensioners.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A method to adjust the tension of a cutting blade installed on a band saw, the band saw having a frame, a screw-type tensioner positioned adjacent to the frame, the screw-type tensioner having a rotatable shaft which has opposing ends, a first pulley rotatably connected to the screw-type tensioner, and a second pulley spaced away from the first pulley comprising the steps of:
   a) positioning a rack and rotatable pinion gear between the screw-type tensioner and the second pulley, wherein the rack and pinion gear are connected by an intermeshed relationship, the rack is movable by the pinion gear and the rack is in a raised position;
   b) engaging the screw-type tensioner with the rack and operationally tensioning the cutting blade via the screw-type tensioner;
   c) lowering the rack in a first direction to detension the cutting blade without further manipulation of the screw-type tensioner; and
   d) raising the rack to completely retension the cutting blade without further manipulation of the screw-type tensioner.

2. The method as claimed in claim 1, further comprising the step of loosening the screw-type tensioner by rotating the rotatable shaft in a counterclockwise direction prior to the step of positioning the rack and pinion gear between the screw-type tensioner and the second pulley.

3. The method as claimed in claim 2, wherein the band saw further comprises an upper pulley shroud.

4. The method as claimed in claim 3, further comprising the step of loosening the upper pulley shroud of the band saw so that the upper pulley shroud can be pulled away from the frame after the step of loosening the screw-type tensioner by rotating the rotatable shaft in a counterclockwise direction.

5. The method as claimed in claim 4, wherein the rack is movably connected to a mount having a first section and a second section, and further comprising the step of sliding the second section of the mount, with the rack removed, between the frame and the upper pulley shroud after the step of loosening the upper pulley shroud of the band saw so that the upper pulley shroud can be pulled away from the frame.

6. The method as claimed in claim 5, further comprising the step of installing the rack in a rack guide defined by the second section of the mount so that the rack is fully seated in the rack guide after the step of sliding the second section of the mount, with the rack removed, between the frame and the upper pulley shroud.

7. The method as claimed in claim 6, further comprising the step of sliding the first section of the mount over the frame after the step of installing the rack in a rack guide defined by the second section of the mount so that the rack is fully seated in the rack guide.

8. The method as claimed in claim 7, further comprising the step of shifting the first and second sections of the mount so that a first end of the rack and one of the opposed ends of the rotatable shaft are aligned with one another, after the step of sliding the first section of the mount over the frame.

9. The method as claimed in claim 8, further comprising the step of attaching the first section of the mount to the second section of the mount using a fastener after the step of shifting the first and second sections of the mount so that a first end of the rack and one of the opposed ends of the rotatable shaft are aligned with one another.

10. The method as claimed in claim 9, further comprising the step of tightening the first pulley shroud after the step of attaching the first section of the mount to the second section of the mount using a fastener.

11. The method as claimed in claim 10, further comprising the step of adjusting the rotatable shaft of the screw-type tensioner so that the second end of the rotatable shaft engages the first end of the rack after the step of tightening the first pulley shroud.

12. The method of claim 1, further including the step of providing a visual indicator that the cutting blade is detensioned.

13. The method of claim 12, further comprising a cutting blade strung between the first and second pulleys, wherein the step of providing a visual indicator is practiced by positioning a portion of a handle operationally connected to the pinion gear in front of the cutting blade when the blade is detensioned.

14. The method as claimed in claim 1, wherein the step of engaging the screw-type tensioner displaces the screw-type tensioner and the first pulley in the first direction.

15. The method of claim 1, including the further step of locking the rack in the raised position by inserting an indexable pin into one of a plurality of adjustment openings.

16. The method as claimed in claim 1, wherein the band saw further comprises a work surface between the first pulley and the second pulley and a handle operatively connected to the pinion gear wherein the lowering step is practiced by moving the handle in a first direction to a first position and the raising step is practiced by moving the handle in a second direction to a second position and further comprising the step of obscuring the work surface with at least a portion of the handle when the handle is in the first position and the cutting blade is detensioned.

17. The method as claimed in claim 16, wherein the handle has a generally L-shaped profile.

18. The method as claimed in claim 16, further comprising a cutting blade strung between the first and second pulleys, wherein the step of obscuring the work surface when the cutting blade is detensioned is practiced by laying the portion of the handle on the work surface in front of an operational cutting surface of the cutting blade.

19. The method as claimed in claim 16, further comprising the step of moving the handle so that the work surface is no longer obstructed and the cutting blade is completely retensioned.

20. The method as claimed in claim 16, including after the step of moving the handle to the first position, the further step of locking the handle in the first position.

21. The method as claimed in claim 16, including after the step of moving the handle to the second position, the further step of locking the handle in the second position.

* * * * *